(12) United States Patent
Wilensky (10) Patent No.: US 8,041,111 B1
(45) Date of Patent: Oct. 18, 2011

(54) SUBJECTIVE AND LOCATABLE COLOR THEME EXTRACTION FOR IMAGES

(75) Inventor: Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1006 days.

(21) Appl. No.: 11/985,532

(22) Filed: Nov. 15, 2007

Related U.S. Application Data (60) Provisional application No. 60/999,055, filed on Oct. 15, 2007.

(51) Int. Cl.
*G06K 9/00* (2006.01)
*G03F 3/08* (2006.01)
*G09G 5/02* (2006.01)

(52) U.S. Cl. ........ 382/168; 382/162; 358/518; 358/522; 345/589; 345/591

(58) Field of Classification Search ................. None
See application file for complete search history.

(56) References Cited

U.S. PATENT DOCUMENTS

| | | | | |
|---|---|---|---|---|
| 5,420,704 | A * | 5/1995 | Winkelman | 358/520 |
| 5,508,718 | A * | 4/1996 | Haikin | 345/601 |
| 6,529,202 | B2 * | 3/2003 | Wu | 345/593 |
| 7,043,094 | B2 * | 5/2006 | Thomas et al. | 382/305 |
| 7,536,048 | B2 * | 5/2009 | Moravec et al. | 382/164 |
| 2006/0232802 | A1 * | 10/2006 | Gray et al. | 358/1.9 |
| 2007/0192164 | A1 * | 8/2007 | Nong et al. | 705/10 |
| 2009/0024580 | A1 * | 1/2009 | Obrador | 707/3 |

OTHER PUBLICATIONS

Cohen-Or, D., Sorkine, O., Gal, R. Leyvand, T., and Y. Xu. "Color Harmonization," Proceedings of ACM SIGGRAPH 2006, pp. 624-630.*
Morse, B.S.; Thornton, D.; Qing Xia; Uibel, J.; "Image-Based Color Schemes", IEEE International Conference on Image Processing, 2007. Sep. 16, 2007-Oct. 19, 2007.*
Boykov & Jolly, "Interactive Graph Cuts for Optimal Boundary & Region Segmentation of Objects in N-D Images". ICCV 2001.*
BJ Meier "ACE: a color expert system for user interface design", ACM 1988.*
Xiaodi Hou, Liqing Zhang "Color Conceptualization", ACM 2007.*
Automated Color Harmony Tools WebSiteOptimization.com. Retrieved from Internet on Nov. 12, 2007. http://www.websiteoptimization.com/speed/tweak/color-harmony/, 2007.
Color Harmonization, Daniel Cohen-Or, et al, International Conference on Computer Graphics and Interactive Techniques archive ACM SIGGRAPH 2006 Papers. Retrieved from Internet on Nov. 12, 2007. http://portal.acm.org/citation.cfm?id=1141933, 2006.

* cited by examiner

*Primary Examiner* — Samir Ahmed
*Assistant Examiner* — Li Liu
(74) *Attorney, Agent, or Firm* — Fish & Richardson P.C.

(57) ABSTRACT

Systems, methods, and program products for subjective and locatable color theme extraction for images. Determining a color density for each of a plurality of colors in an image where each of the plurality of colors belongs to a color space, extracting one or more distinct theme colors from the plurality of colors based on qualitative parameters and the determined color densities, and mapping each extracted theme color to a color occurring in the image where the mapping is based on a color distance between the theme color and colors occurring in the image.

25 Claims, 6 Drawing Sheets
(2 of 6 Drawing Sheet(s) Filed in Color)

SUBJECTIVE AND LOCATABLE COLOR THEME EXTRACTION FOR IMAGES

CROSS-REFERENCE TO RELATED APPLICATIONS

This application claims priority to pending U.S. Provisional Application Ser. No. 60/999,055, filed Oct. 15, 2007, the entire contents of which are hereby incorporated by reference.

BACKGROUND

A color theme can be automatically derived from a digital image. For example, a color theme might consist of the five most frequently occurring colors in an image. Yet the extraction of a set of colors from a digital image is not a well defined problem—it is a subjective process which is shaped by the user's intent. One person may differ from another in the choice of colors. One person may choose to extract bright and cheery colors; another may choose a more natural set; yet another may choose a more drab or dreary set. Moreover, typical techniques for extracting colors produce them from an approximate color distribution (e.g., a histogram) and do not ensure that these colors actually correspond to exact colors or locations in the image.

SUMMARY

In general, one or more aspects of the subject matter described in this specification can be embodied in one or more methods that include receiving one or more qualitative color theme parameters. A color density is determined for each of a plurality of colors in an image where each of the plurality of colors belongs to a color space. One or more distinct theme colors are extracted from the plurality of colors based on the qualitative parameters and the determined color densities. Each extracted theme color is mapped to a color occurring in the image where the mapping is based on a color distance between the theme color and colors occurring in the image. Other embodiments of this aspect include corresponding systems, apparatus, and computer program products.

These and other embodiments can optionally include one or more of the following features. A qualitative color theme parameter is a degree of: colorfulness, brightness, looseness, tightness, saturation, shadow suppression, cheerfulness, or drabness. Each determined color density is a normalized logarithmic density weighted by the color theme parameters. Extracting comprises selecting the theme colors so as to minimize a function that takes into account the determined color density of each theme color and color distances between all pairs of the theme colors. Theme colors are attracted to image areas of high color density and repulsed from colors that are close in color distance to other theme colors. The measure of color distance is Euclidean distance in CIELAB color space. A spatial location is determined where each mapped theme color occurs in the image. Input is accepted to change the determined spatial location for a first theme color to a new spatial location in the image and the first theme color is changed to be the color corresponding to the new spatial location.

Various implementations provide a technique to automatically extract a set of colors (a color theme) representative of the colors in a given digital image and subject to user-determined qualitative preferences. In further implementations, the extracted theme colors are exact matches to colors in the image as well as the corresponding locations in the image. This enables a combined automatic and manual workflow for choosing color themes.

Particular implementations of the subject matter described in this specification can be implemented to realize one or more of the following advantages. A color theme is automatically extracted from a digital image. The extraction can be applied to a portion of a digital image or to one or more images including frames from a video sequence. Users are given the ability to control subjective aspects of the color theme extraction with intuitive choices such as colorful, drab, bright, etc., that provide direction to the process. Other qualitative controls influence the looseness or tightness of the theme colors—this controls whether they are spread out more evenly across the representative colors in the image or whether they clump very tightly together in color space.

The desired number of theme colors can be specified by users. Each theme color presented in an extracted color theme is a precise match to the color at some pixel location in the image. One or more representative locations for each theme color are provided and can be visualized as an overlay on top of the image. The representative locations can be interactively changed by users resulting in changes to corresponding theme colors. Colors having a small representation in an image are not ignored for purposes of color theme extraction due to the use of a weighted color density function.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1A:
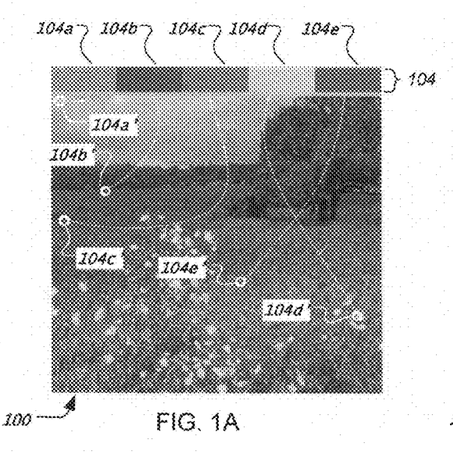
FIGS. 1A-C illustrate example color themes extracted from the same image and example locations for theme colors in the image.
Figure 1B:
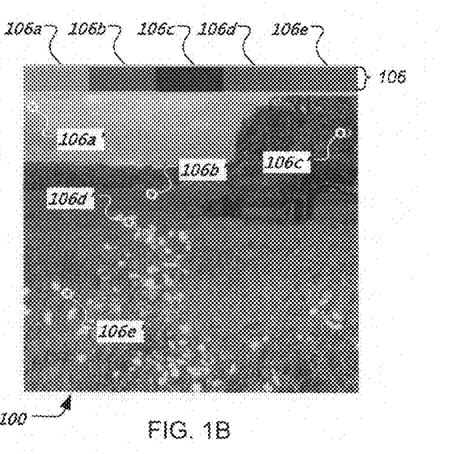
Figure 1C:
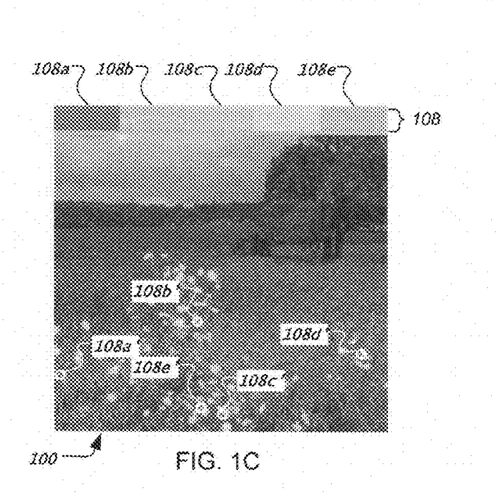

FIGS. 1A-C illustrate example color themes extracted from the same image and example locations for theme colors in the image. A color theme is a set of one or more colors; typically the colors are thematically related. Color themes are automatically extracted from images using one or more qualitative or subjective parameters. By way of illustration, a user would like to extract color themes from image 100 that reflect natural colors, drab colors, or cheerful colors. Implementations enable the extraction of a color theme from a digital image (which for brevity will simply be referred to as an image). Color theme extraction can be applied to a portion of an image or to one or more images including frames (or portions of frames) from a video sequence. An image does not necessarily correspond to a file. An image may be stored in a portion of a file that holds other content, in a single file dedicated to the image in question, or in multiple coordinated files. Moreover, an image can be stored in a memory without having first been stored in a file.

FIG. 1A illustrates an example "natural" color theme 104 extracted from image 100. A natural theme includes theme colors that a user would perceive as occurring in nature. The color theme 104 includes five theme colors 104a-e. Each theme color occurs at least once in the image 100. In various implementations, a given theme color's location(s) in an image can be visually depicted. By way of illustration, a representative location for each theme color 104a-e is indicated by circles connected to each theme color 104a'-e' in the color theme 104. For example, theme color 104c occurs in the image 100 at location 104c'. In further implementations, users can manually change individual theme colors by moving the color location indicators (e.g., 104c'). This is described below with reference to FIG. 4.

By way of further illustration, FIG. 1B illustrates an example "drab" color theme 106 extracted from image 100. A drab color theme includes theme colors that a user would perceive as being dull and lacking in brightness. The color theme 106 also includes five theme colors 106a-e. A representative location for each theme color 106a-e is indicated by circles 106a'-e'. In contrast, FIG. 1C illustrates an example "cheerful" color theme 108 extracted from image 100. A cheerful color theme includes theme colors that a user would perceive being bright or colorful. The color theme 108 includes five theme colors 108a-e, whose representative locations in the image 100 are indicated by 108a'-e'.

Implementations treat each color in a color theme as a point in a three dimensional color distribution in a color space such as Hue-Saturation-Brightness (HSB). Other color spaces are possible. A color distribution—also known as a color histogram or density—is a record of the frequency of occurrence of colors in an image. A color theme consists of N colors, and hence N color points, where N can be 1, 2, 3 . . . up to some arbitrarily large number. The color theme is determined by finding the locations in color space for all the color points so as to minimize an overall energy function. In various implementations, the energy function contains a term which tries to keep color points in regions of high image color density so that the solution will tend to pick up colors that are more highly represented in the image. It also contains a separate repulsive term which is designed to keep color points from falling on top of each other.

In various implementations, a weighted color density logarithmic function is employed which combines the logarithm of the frequency of occurrence with weighting factors that incorporate the subjective aspects of the extraction. Other functions than the logarithm can be used (e.g., linear, quadratic), but the logarithm is a useful way to map from a multiplicative frequency of occurrence to an additive energy. For example, the logarithmic function provides a more even representation and ensures that colors which only have a small representation in the image get their fair share of weight. In order to produce colors which are exact matches of colors in the image and to identify the corresponding locations in the image from which these colors are obtained, the algorithm implements a second pass through the image to find these locations and colors which match as closely as possible those found from the first pass global color analysis. This is described below in reference to FIG. 2.

In various implementations, a color theme is defined to be a set of N colors:

theme={color1,color2,colorN}.

There could be only one color in the theme (N=1) or there could be many. The objective is to determine these colors as well as a set of representative locations in the image for the colors:

R={r1,r2,rN} at which locations the image color is equal to the theme color.

Let n(c) be the number of pixels in the image which have color c, where c is a vector representing the color components in a color space. For grayscale c has just one component and is the intensity value; for Red-Green-Blue (RGB) c has three components (red, green, blue); for HSB, c has three components (hue, saturation, brightness). Other color spaces are possible. One implementation uses the HSB color space for counting the number of pixels and the corresponding distributions. In various implementations, the colors are quantized into discrete levels. For example, the colors can be quantized into 256 discrete levels (8 bits of depth) each. By way of a further illustration, 64 quantization levels can be used for hue and saturation and 10 levels for brightness. Other ways to quantize color spaces are possible.

The color space can be arbitrarily partitioned. For example, one may choose a separate number for the number of quantization levels along each color dimension. This results in an evenly spaced rectangular partition of the color space. One may also use a non-rectangular partition or a partition which is not evenly spaced. An example of the latter is the so-called kD tree approach to partitioning in which the color space is divided by planes (or hyperplanes if there are more than three color dimensions) and each planar partition can be further divided by more planes, and so on.

In order to accommodate a user's subjective preferences the pixel counts are weighted with a weighting function:

$nW(c)$=weight*$n(c)$.

In various implementations, weight=colorfulnessEnhancementWeight*shadowSuppressionWeight*saturationWeight*brightnessWeight, and colorfulnessEnhancementWeight=suppression(colorfulness,colorfulnessEnhancement), shadowSuppressionWeight=suppression(brightness,shadowSuppression), saturationWeight=cubicSigmoid(saturation,0,30), brightnessWeight=cubicSigmoid(brightness,0,30), with the cubicSigmoid function defined as cubicSigmoid($x,x1,x2$)=0.5*(1.0+$y$*(1.5−0.5*$y$*$y$)), where $y$=2*($x$−$x1$)/($x2$−$x1$)−1, and the suppression function is defined to suppress low values:

suppression(value,amount)=profile^(1+3 g), with profile=$f$*cubicSigmoid(value/255)+1−$f$, where $f=1$ for amount>=0.5, $f=2*$amount for amount<0.5, $g=2*$amount$-1$ for amount>=0.5, $g=0$ for amount<0.5.

In various implementations, the colorfulness is defined (for 8 bit colors) to be colorfulness=brightness*saturation/255.

In various implementations, the constant values are:

colorfulnessEnhancement=0.58, shadowSuppression=0.38.

These values can be under user control as a means of offering a choice different qualitative methods for extracting the color themes. The weight function accommodates the user preferences for colorfulness and brightness and at the same time reduces the importance of unsaturated and dark colors. Other weight functions are possible. In general any mathematical function of the color components can be used. One example would be replacing the cubicSigmoid function with the sigmoid function, sigmoid $(x)=1/(1+\exp(-x))$.

In order to produce a color distribution function which provides adequate representation to colors which may occupy only a small fraction of the image area, a normalized logarithmic density can be employed. This will enable the algorithm to extract, for instance, a bright red single small poppy in a field of green grass when the intent is to pick out a colorful theme.

Let nWMax be the maximum value of nW(c) among all the color bins:

$nW$Max=maximum value of $nW(c)$, taken for all possible values of $c$.

Then the weighted logarithmic density is defined as density$(c)=\log(nW(c))/\log(nW$Max$)$, as long as nW(c) is greater than unity, and density(c) is zero otherwise. Because of the normalization, this density is guaranteed to be less than or equal to unity. Other density functions are possible. Other examples include:

density2$(c)=$density$\hat{\ }$power raising the density to some power, or density3$(c)=$constant$*nW(c)\hat{\ }$power.

Higher powers will tend to discount the less frequently occurring colors; lower powers will tend to emphasize them.

This weighted density can now be used to build an energy function. In various implementations, an energy function which depends upon the colors in a color theme is used to find the colors for the theme which will minimize the energy. These colors will be the desired theme colors.

$$\text{Energy} = \sum_{c1} E(c1) + \sum_{c1,c2} V(c1, c2)$$

where the first summation is over all colors, c1, in the theme. The second summation is over all pairs of colors, c1 and c2, chosen from the theme. This summation excludes terms in which c1 and c2 refer to the same entry in the theme.

The first piece of the energy, E, attempts to keep the theme colors near regions of high density in color space (low energy implies high density):

$E(c1)=1-$density$(c1)$.

The second piece of the energy attempts to keep the colors from piling on top of each other. It does this by producing a strong repulsive hard core interaction when the colors are too close together as well as a more gradual repulsion (e.g., Coulomb-like) for larger color separations.

Let d(c1, c2) be a measure of distance in color space between the two colors c1 and c2. Many measures of distance can be used. In various implementations, a Euclidean distance in Lab color space:

$d(c1,c2)=d(\{l1,a1,b1\},\{l2,a2,b2\}=(l1-l2)2+(a1-a2)2+(b1-b2)2$.

Other possibilities include using other metrics (L1 norm, L3, norm, LN norm, etc.) or other color spaces (RGB, HSB, various perceptual color spaces, etc.).

A hard core interaction radius in color space is specified as follows:

hardCoreInteractionRadius=4.0(for 8 bit colors)

and let hardCoreEnergy=largest possible floating point number/1000.

Then the interaction portion of the energy can be defined as $V(c1,c2)=$hardCoreEnergy$*(1.0-d(c1,c2)/$hardCoreInteractionRadius$)$ if d(c1, c2) is less than hardCoreInteractionRadius, and $V(c1,c2)=$colorRepulsion$*(1.0/d(c1,c2)-1.0/$hardCoreInteractionRadius$)$ if d(c1, c2) is greater than or equal to hardCoreInteractionRadius.

Note that the colorRepulsion and hardCoreInteractionRadius parameters can be varied. These values could be controlled by the user to vary the degree of looseness or tightness in the extraction of colors.

In various implementations, the goal is to find the set of colors in the theme which will produce the smallest value for the energy function. In further implementations, all possible values for each color in the theme are considered and the set of color values which yields the smallest value of the energy is chosen. One implementation finds a so-called greedy solution. This is a faster method and can produce results which are more in line with some users' expectations. Initially, the single best color which will produce the minimum energy is found. That color is kept fixed and the next best color is found. Because of the interaction energy, this determination depends upon the color chosen in the first step. The process is repeated for each color slot in the theme. Hence, the first color in the theme represents the best choice if we only had one color to choose. The second color in the theme represents the best choice given that we already know the first single best color. And so on.

Other implementations for minimizing the energy function are possible. One example of an alternate approach is to begin by randomly placing the color locations in the color space. Or the locations could be chosen using the greedy approach. Then the locations in color space can be refined by testing each point to see if a smaller energy is achieved if that point is moved slightly by some small specified amount dc. If the energy is reduced, this value is accepted. The end result of this process is a determination of color values for all color entries in the theme.

Figure 2:
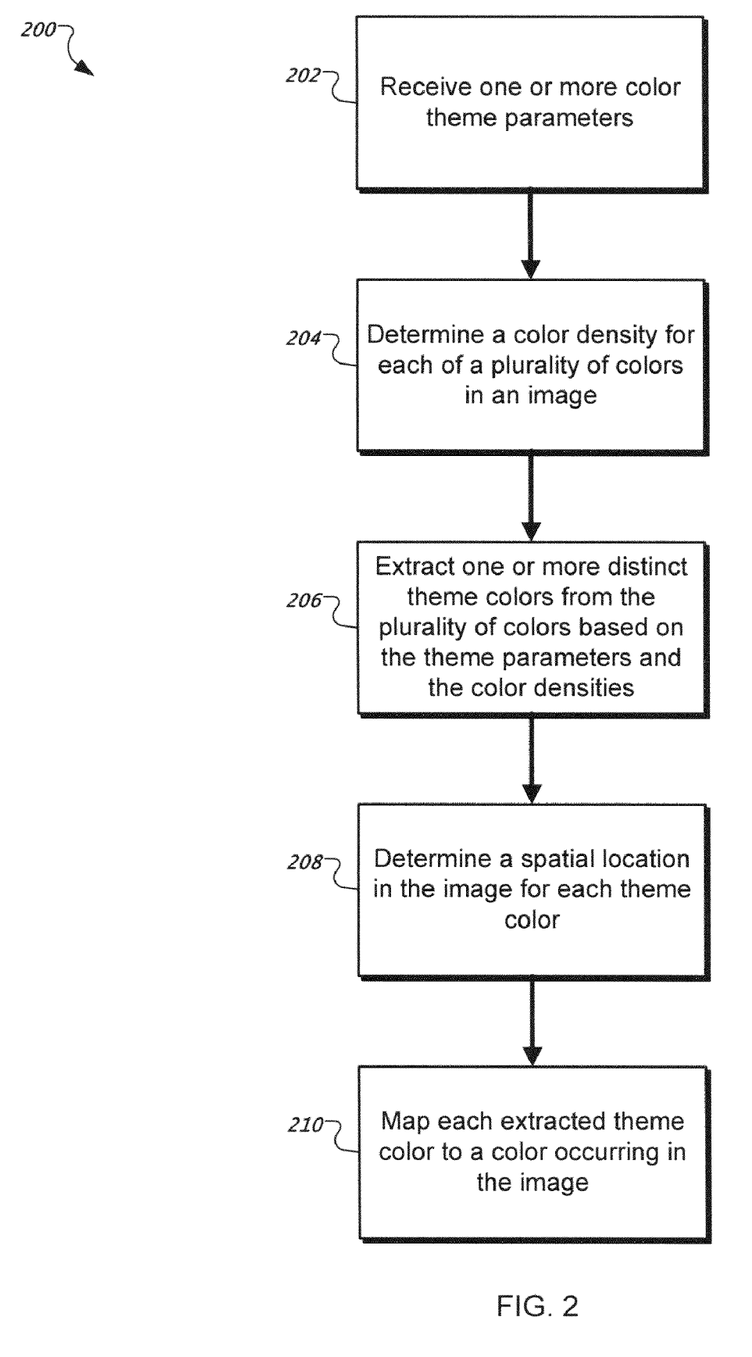
FIG. 2 is a flow chart of an example technique for automatically extracting a color theme from an image.

FIG. 2 is a flow chart of an example technique 200 for automatically extracting a color theme from an image. By way of a user interface or other means, one or more qualitative color theme parameters are received (step 202). The parameters specify subjective aspects of color theme extraction that will influence which theme colors are selected. As will be described below in reference to FIG. 4, values such as a degree of colorfulness, brightness, saturation, and other parameters can be specified. In various implementations, the parameter values are used to create a weighted color density function. The color density function is used to determine a color density for each of a plurality of colors in the image (step 204). One or more distinct theme colors are then extracted from the plurality of colors based on the qualitative color theme parameters and the color densities (step 206). In some implementations, the theme colors produce the smallest value for an energy function. For each theme color, the closest matching color in the image is located (step 208). The closeness can be determined based on a closeness in a color space, for example. Other ways of determining closeness are possible. One might also include spatial distance (distance in the image plane) along with color distance. For example closeness(point1,point2)=squareRoot($dC12^2+ dr12^2$), where dC12 is the distance in color space between the two points and dr12 is the spatial distance(e.g., $dr12=squareRoot((x1-x2)^2+(y1-y2)^2)$).

In some implementations, the first encountered closest match is selected when there are more than one image pixel color having the same distance from a given theme color. The location (horizontal and vertical pixel coordinate) of the closest matching pixel is the location of the theme color (step 210).

Because of the subjective nature of selecting a color theme from an image, it is important to give users a manual level of control over the theme color choices in addition to the automatic selection. The manual process should interact well with the automatic portion. Thus, in various implementations, in addition to automatically determining a color theme extracted from an image users are also shown the representative locations of the theme colors (e.g., as markers of some kind) in the image so that the user may then easily move the locations around to modify the colors (e.g., picking up other colors in the image underneath the marker).

Figure 3:
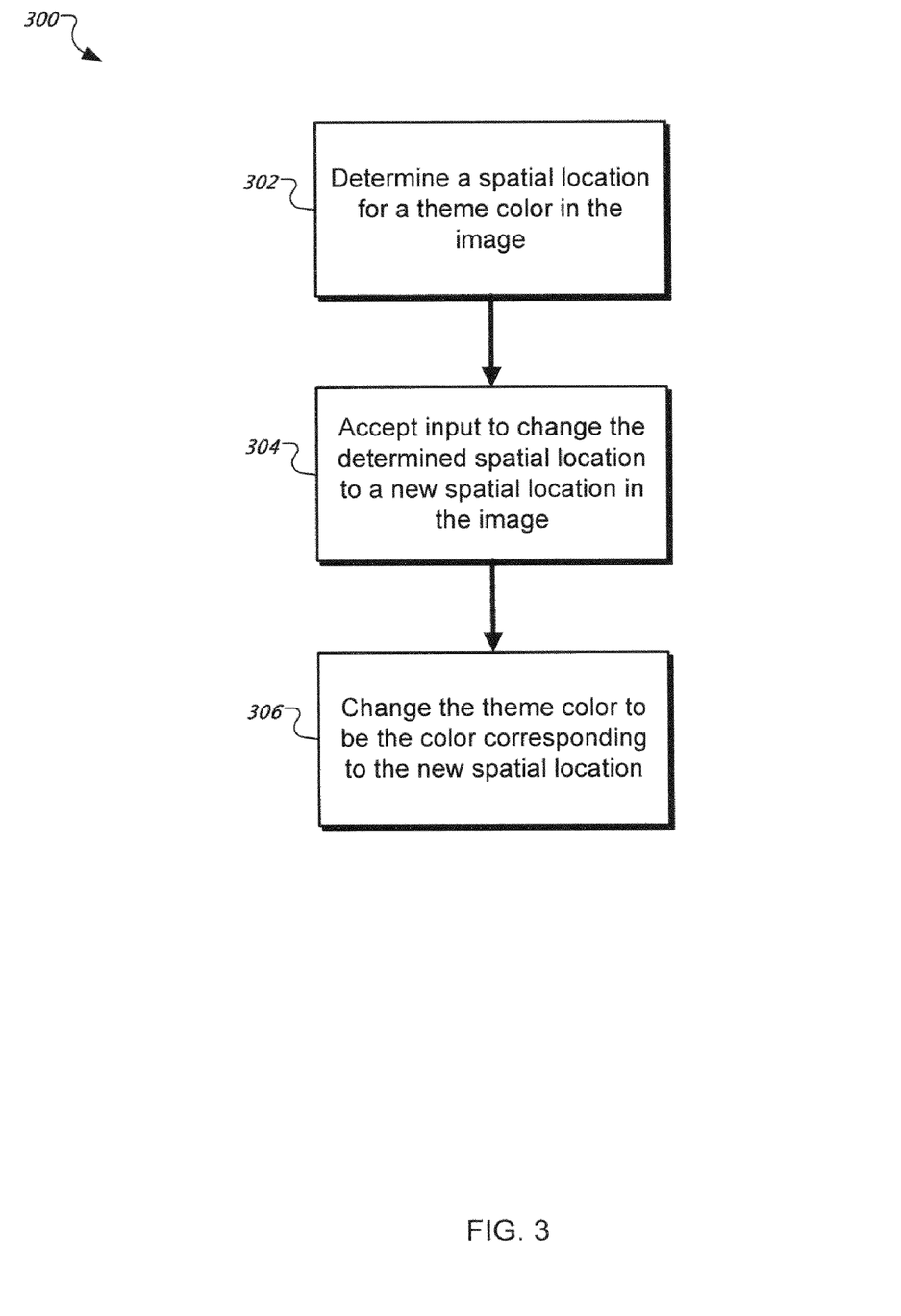
FIG. 3 is a flow chart of an example technique for changing a theme color.

FIG. 3 is a flow chart of an example technique 300 for changing a theme color. A spatial location for a theme color in the image is determined (step 302). This is described above in reference to FIG. 2, for example. Input is then accepted to change the determined spatial location to a new spatial location in the image (step 304). In various implementations, a visual indication (e.g., a circle) of the theme color's representative position is overlaid on the image. Input is accepted to move the visual indication such as by dragging the indication with a mouse, for instance. As a result, the theme color's value is changed to be that of the pixel indicated by the moved visual indication (step 306).

Figure 4:
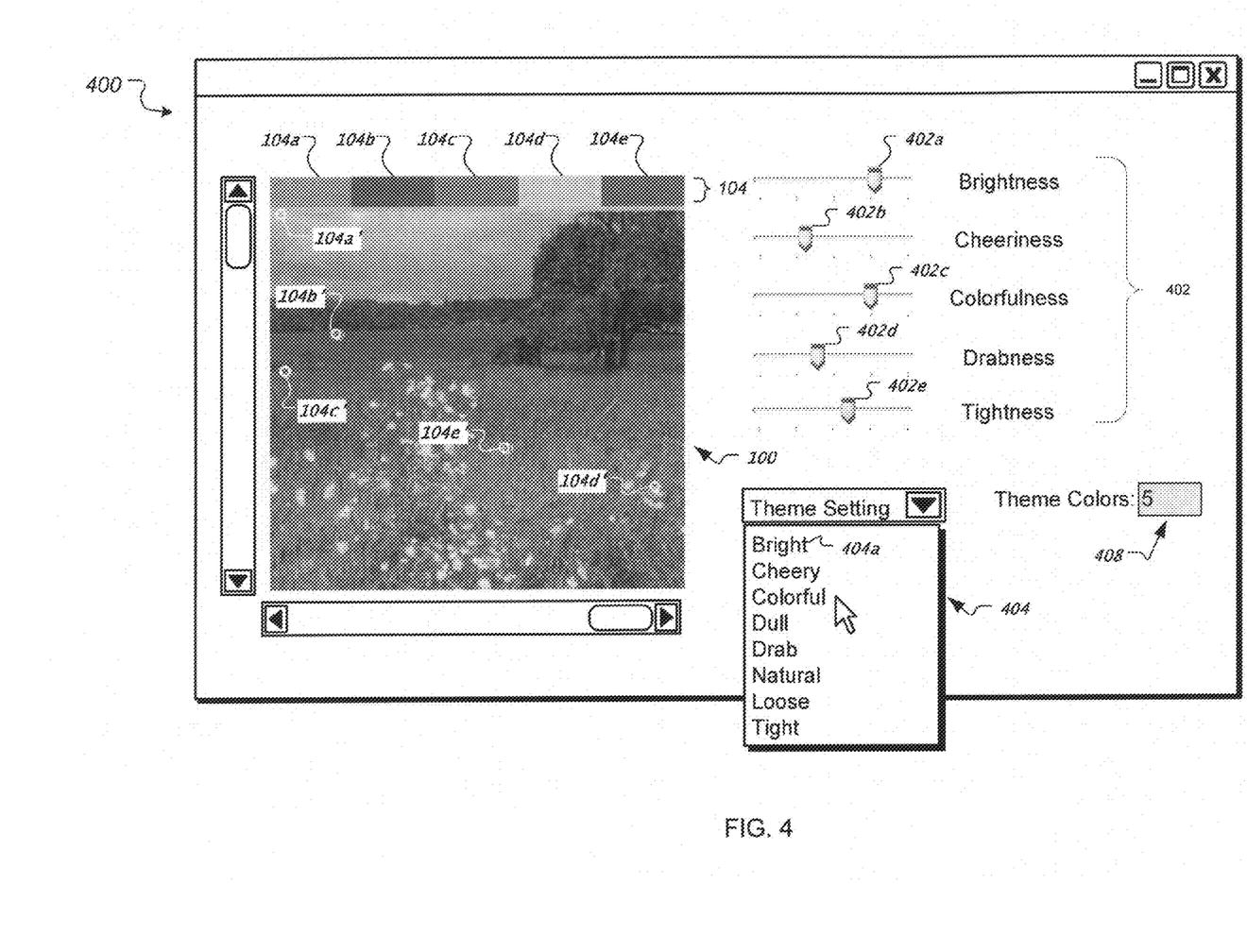
FIG. 4 illustrates an example graphical user interface for controlling subjective aspects of color theme extraction.

FIG. 4 illustrates an example graphical user interface (GUI) 400 for controlling subjective aspects of color theme extraction. The GUI 400 displays an image 100 of the user's choosing, as well as a current color theme 104 for the image which includes theme colors 104a-e. The number of theme colors in the color theme 104 is specified by input filed 408. There can be 1 to Theme color locations 104a'-b' are optionally shown overlaid on the image. In some implementations, a theme color location (e.g., 104b') is indicated by a circle where the pixel located at the center of the circle is both the color theme's color and a representative location of the color theme in the image 100. In other implementations, all locations of a color theme in the image 100 are indicated. Other techniques for illustrating the location of theme colors in the image 100 are possible.

Qualitative color theme parameters 402 can be specified through the GUI 400. The parameter values are used to create a weighted color density function. By way of illustration, sliders 402a-e or other input means can be provided that allow users to interactively adjust parameters to see how the color theme 104 changes. For example, slider 402d can control the degree of "drabness" in the color theme. When the slider 402d is all the way to the left, there is a zero degree of drabness and when the slider 402d is moved progressively to the right, the degree of drabness increases. Alternatively, predefined parameter settings can be given names and accessed through a pull-down menu 404 or other means. For example, "bright" 404a settings would tend to move sliders 402a-c to the right and sliders 402d-e to the left.

Figure 5:
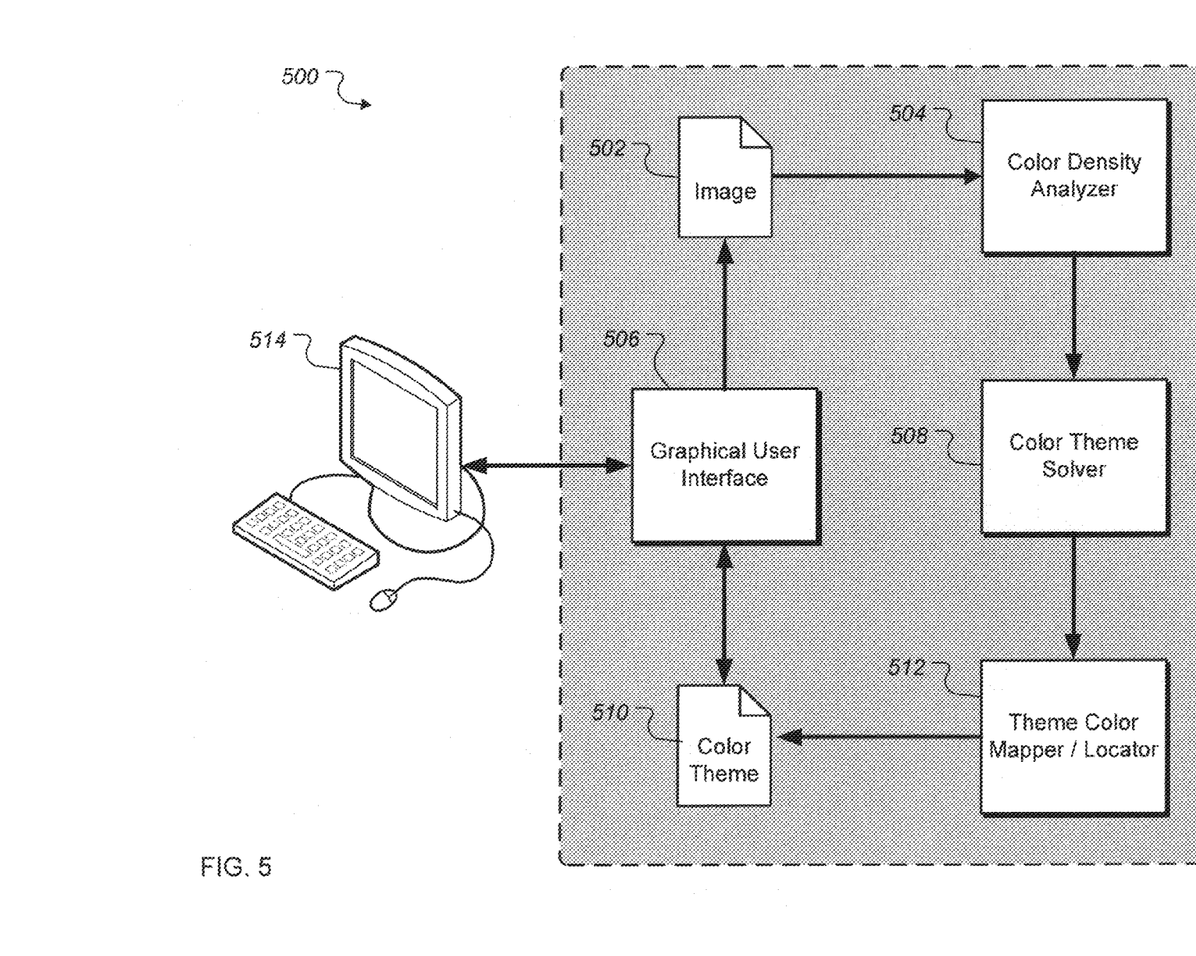
FIG. 5 is an example system for color theme extraction.

FIG. 5 is an example system 500 for color theme extraction. Although several components are illustrated, there may be fewer or more components in the system 500. Moreover, the components can be distributed on one or more computing devices connected by one or more networks or other suitable communication means. The components can be implemented in software, firmware, hardware, or combinations of these.

A user can interact with the system 500 through a computer 514 or other device. For example, the computer 514 can be a computer terminal within a local area network (LAN) or wide area network (WAN). In particular, users can utilize the system 500 to extract a color theme from an image 502. A GUI 506 presents an interactive user interface on the computer 514 which allows users to select an image 502 and specify qualitative parameters to guide the color theme extraction process for the image. The image 502 is provided to a color density analyzer 504 which determines a weighted color density for colors in the image based on the qualitative parameters. A color theme solver 508 utilizes the color densities to find the theme colors 510. A theme color mapper/locator component 512 locates representative locations of the colors 510 in the image 502. The color theme 510 and, optionally, the representative locations, are then displayed by the GUI 506. In some implementations, the GUI 506 provides a visual indication of color theme locations in the image which users can interactively manipulate to change theme colors in the color theme 510. User changes to the theme colors are displayed by the GUI 506.

Figure 6:
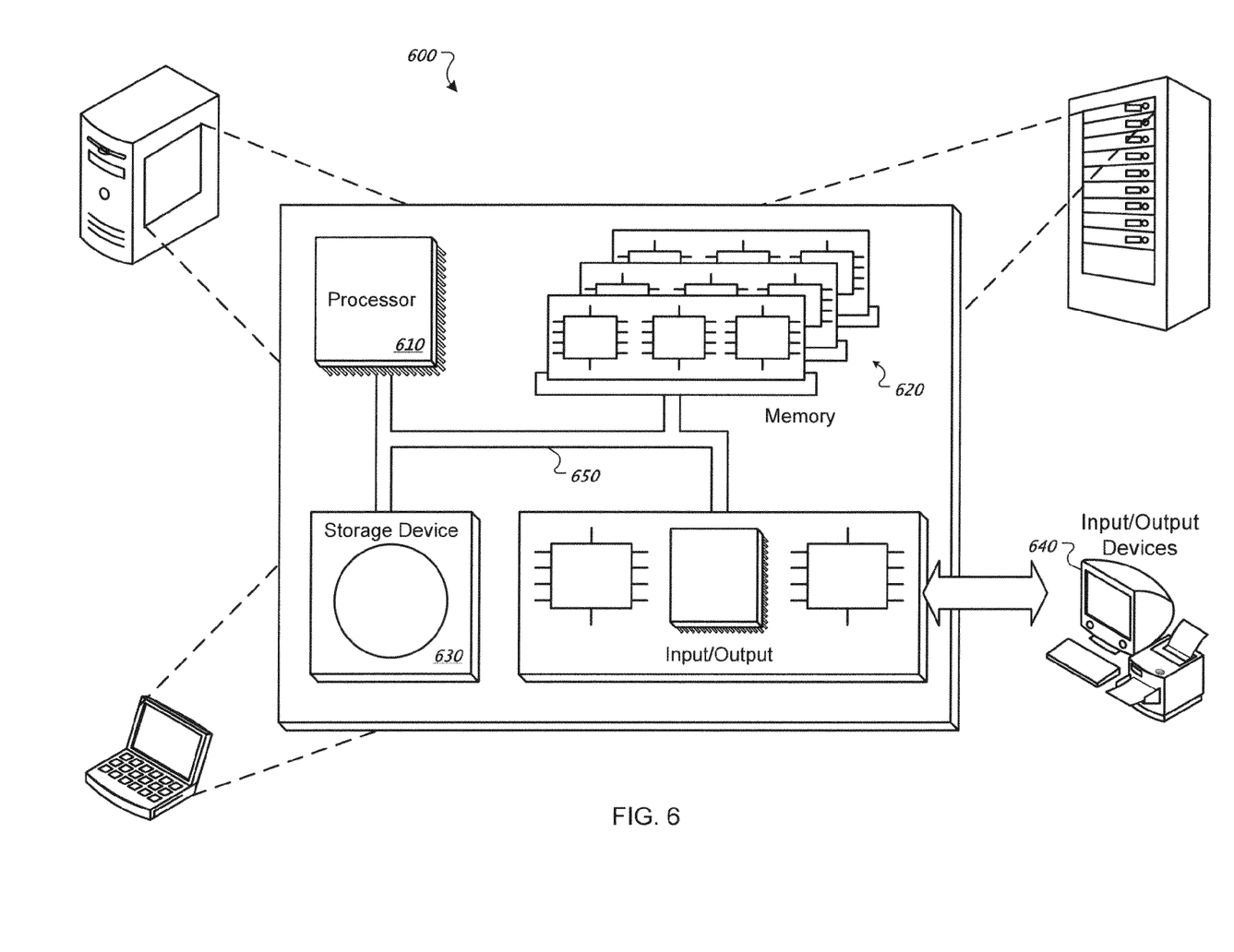
FIG. 6 is an illustration of an example generic computer system.

FIG. 6 is an illustration of an example generic computer system. The system 600 can be used for practicing operations described in association with the techniques and systems described above. The system 600 can include a processor 610, a memory 620, a storage device 630, and input/output devices 640. Each of the components 610, 620, 630, and 640 can be interconnected using a system bus 650. The processor 610 is capable of processing instructions for execution within the system 600. Such executed instructions can implement one or more components of system 500, for example. The processor 610 is a single-threaded or multi-threaded processor having one or more processor cores. The processor 610 is capable of processing instructions stored in the memory 620 or on the storage device 630 to display graphical information for a user interface on the input/output device 640.

The memory 620 is a computer readable medium such as volatile or non volatile random access memory that stores information within the system 600. The memory 620 could store data structures representing images and color densities, for example. The storage device 630 is capable of providing persistent storage for the system 600. The storage device 630 may be a floppy disk device, a hard disk device, an optical disk device, or a tape device, or other suitable persistent storage means. The input/output device 640 provides input/output operations for the system 600. The input/output device 640 includes a keyboard and/or pointing device (e.g., a mouse) and a display unit for displaying graphical user interfaces.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method, comprising:
receiving one or more qualitative color theme parameters;
determining a color density for each of a plurality of colors in an image where each of the plurality of colors belongs to a color space;

extracting one or more distinct theme colors from the plurality of colors based on the qualitative parameters and the determined color densities; and mapping each extracted theme color to a color occurring in the image where the mapping is based on a color distance between the theme color and colors occurring in the image.

2. The method of claim 1 where a qualitative color theme parameter is a degree of: colorfulness, brightness, looseness, tightness, saturation, shadow suppression, cheerfulness, or drabness.

3. The method of claim 1 where each determined color density is a normalized logarithmic density weighted by the color theme parameters.

4. The method of claim 1 where extracting comprises:
selecting the theme colors so as to minimize a function that takes into account the determined color density of each theme color and color distances between all pairs of the theme colors.

5. The method of claim 4 where theme colors are attracted to image areas of high color density and repulsed from colors that are close in color distance to other theme colors.

6. The method of claim 4 where the measure of color distance is Euclidean distance in CIELAB color space.

7. The method of claim 1, further comprising:
determining a spatial location where each mapped theme color occurs in the image.

8. The method of claim 7, further comprising:
accepting input to change the determined spatial location for a first theme color to a new spatial location in the image; and
changing the first theme color to be the color corresponding to the new spatial location.

9. A computer program product, encoded on a non-transitory computer-readable medium, operable to cause data processing apparatus to perform operations comprising:
receiving one or more qualitative color theme parameters;
determining a color density for each of a plurality of colors in an image where each of the plurality of colors belongs to a color space;
extracting one or more distinct theme colors from the plurality of colors based on the qualitative parameters and the determined color densities; and
mapping each extracted theme color to a color occurring in the image where the mapping is based on a color distance between the theme color and colors occurring in the image.

10. The program product of claim 9 where a qualitative color theme parameter is a degree of: colorfulness, brightness, looseness, tightness, saturation, shadow suppression, cheerfulness, or drabness.

11. The program product of claim 9 where each determined color density is a normalized logarithmic density weighted by the color theme parameters.

12. The program product of claim 9 where extracting comprises:
selecting the theme colors so as to minimize a function that takes into account the determined color density of each theme color and color distances between all pairs of the theme colors.

13. The program product of claim 12 where theme colors are attracted to image areas of high color density and repulsed from colors that are close in color distance to other theme colors.

14. The program product of claim 12 where the measure of color distance is Euclidean distances in CIELAB color space.

15. The program product of claim 9, further comprising:
determining a spatial location where each mapped theme color occurs in the image.

16. The program product of claim 15, further comprising:
accepting input to change the determined spatial location for a first theme color to a new spatial location in the image; and
changing the first theme color to be the color corresponding to the new spatial location.

17. A system comprising:
a user interface; and
one or more computers operable to interact with the user interface device and to perform the following operations:
receiving one or more qualitative color theme parameters;
determining a color density for each of a plurality of colors in an image where each of the plurality of colors belongs to a color space;
extracting one or more distinct theme colors from the plurality of colors based on the qualitative parameters and the determined color densities; and
mapping each extracted theme color to a color occurring in the image where the mapping is based on a color distance between the theme color and colors occurring in the image.

18. The system of claim 17, wherein the one or more computers comprise a server operable to interact with the user interface through a data communication network, and the user interface is operable to interact with the server as a client.

19. The system of claim 18, wherein the user interface device comprises a personal computer running a web browser.

20. The system of claim 17 where a qualitative color theme parameter is a degree of: colorfulness, brightness, looseness, tightness, saturation, shadow suppression, cheerfulness, or drabness.

21. The system of claim 17 where each determined color density is a normalized logarithmic density weighted by the color theme parameters.

22. The system of claim 17 where extracting comprises:
selecting the theme colors so as to minimize a function that takes into account the determined color density of each theme color and color distances between all pairs of the theme colors.

23. The system of claim 22 where theme colors are attracted to image areas of high color density and repulsed from colors that are close in color distance to other theme colors.

24. The system of claim 22 where the measure of color distance is Euclidean distance in CIELAB color space.

25. The system of claim 17 where the computers are further operable to interact with the user interface device and to perform the following further operations:
determining a spatial location where each mapped theme color occurs in the image.

* * * * *